(12) United States Patent
Pesch

(10) Patent No.: US 12,472,713 B2
(45) Date of Patent: Nov. 18, 2025

(54) APPARATUS FOR MANUFACTURING A PIPE SECTION AND A METHOD FOR MANUFACTURING A PIPE SECTION

(71) Applicant: ROCKWOOL A/S, Hedehusene (DK)

(72) Inventor: Johan Hendrik Theodoor Marie Pesch, Hedehusene (DK)

(73) Assignee: ROCKWOOL A/S, Hedehusene (DK)

( * ) Notice: Subject to any disclaimer, the term of this patent is extended or adjusted under 35 U.S.C. 154(b) by 135 days.

(21) Appl. No.: 18/560,320

(22) PCT Filed: May 11, 2022

(86) PCT No.: PCT/EP2022/062763
§ 371 (c)(1),
(2) Date: Nov. 10, 2023

(87) PCT Pub. No.: WO2022/238473
PCT Pub. Date: Nov. 17, 2022

(65) Prior Publication Data
US 2024/0239066 A1    Jul. 18, 2024

(30) Foreign Application Priority Data

May 12, 2021  (EP) .................................. 21173461

(51) Int. Cl.
| | |
|---|---|
| *B29C 53/40* | (2006.01) |
| *B29C 53/56* | (2006.01) |
| *B29D 23/00* | (2006.01) |
| *B65H 18/22* | (2006.01) |
| *B29C 53/42* | (2006.01) |
| *B29C 53/46* | (2006.01) |
| *B29L 23/00* | (2006.01) |

(52) U.S. Cl.
CPC .......... *B29D 23/001* (2013.01); *B29C 53/566* (2013.01); *B65H 18/22* (2013.01); *B29C 53/42* (2013.01); *B29C 53/46* (2013.01); *B29K 2913/00* (2013.01); *B29L 2023/225* (2013.01); *B65H 2701/174* (2013.01)

(58) Field of Classification Search
CPC ......... B29C 53/08; B29C 53/40; B29C 53/42; B29C 53/46; B29C 53/60; B29C 53/80; B29C 53/805; B29C 53/8058
See application file for complete search history.

(56) References Cited

U.S. PATENT DOCUMENTS 3,253,973 A * 5/1966 Anderberg .............. B29C 53/60
                                                          156/193
3,964,232 A    6/1976 Bender et al.
(Continued)

FOREIGN PATENT DOCUMENTS

| EP | 1026302 A2 | 8/2000 |
| GB | 1503644 A | 3/1978 |

*Primary Examiner* — Thu Khanh T. Nguyen
(74) *Attorney, Agent, or Firm* — Dinsmore & Shohl LLP

(57) ABSTRACT

An apparatus for manufacturing an insulating pipe section includes a rotatable longitudinal mandrel configured for receiving and winding uncured mineral wool around the mandrel to manufacture an insulating pipe section, a belt, preferably an endless belt, at least two longitudinal jaws engaging the belt, wherein the jaws are configured for surrounding the mandrel with the belt, and a mandrel controlling element configured for actively controlling a transverse movement of the mandrel.

20 Claims, 3 Drawing Sheets

(56) References Cited

U.S. PATENT DOCUMENTS 5,585,062 A * 12/1996 Muramatsu ............. B29C 53/44
264/316
RE38,552 E * 7/2004 Hadzicki ................. B29C 70/32
425/373

* cited by examiner

APPARATUS FOR MANUFACTURING A PIPE SECTION AND A METHOD FOR MANUFACTURING A PIPE SECTION

CROSS-REFERENCE TO RELATED APPLICATIONS

This application is the U.S. National Stage of PCT/EP2022/062763 filed on May 11, 2022, which claims priority to European Patent Application 21173461.1 filed on May 12, 2021, the entire content of both are incorporated herein by reference in their entirety.

FIELD OF THE INVENTION

The present invention relates to an apparatus for manufacturing an insulating pipe section and a method for manufacturing an insulating pipe section. Whenever the terms "pipe section" or "insulating pipe section" are used in this specification they mean a tubular element made of a thermally and/or acoustically insulating material.

BACKGROUND OF THE INVENTION

For heat insulating pipes carrying fluids like liquids or gases with a temperature that differs from the temperature of the surroundings pipe sections made of a heat insulating material are a good solution. The pipe sections will also prevent condensation on pipes carrying cold fluids. Insulating pipe sections may be made of various heat insulating materials, such as mineral wool (glass wool, stone wool), polymeric foam, foamglass, etc. GB1503644 discloses a pipe section winding machine, wherein a pipe section is manufactured by winding a web of uncured mineral wool around a mandrel arranged in a loop of an endless belt and subsequently curing the wound mineral wool. The diameter of the loop is controlled by a movable member as a function of the linear speed of the belt and the length and weight per unit of the fibrous web. In this machine the mandrel for the pipe section can move uncontrollable in a slot as the diameter of the wound pipe section increases.

SUMMARY OF THE INVENTION

Considering the prior art described above, it is an object of the present invention to present an apparatus for manufacturing a pipe section, wherein the manufacturing of the pipe section can be controlled in more detail and maybe even varied during the manufacture to obtain a higher quality product.

The object can be achieved by means of an apparatus for manufacturing an insulating pipe section, wherein the apparatus comprises a rotatable longitudinal mandrel configured for receiving and winding uncured mineral wool around the mandrel to manufacture an insulating pipe section, a belt, preferably an endless belt, at least two longitudinal jaws engaging the belt, wherein the two jaws are configured to move between an open position and a closed position where the jaws are configured for substantially surrounding the mandrel with the belt, a mandrel controlling element configured for actively controlling a transverse movement of the mandrel.

To begin the winding process a web of uncured mineral wool is entered between the mandrel and the belt so that, when the belt and the mandrel are driven, the web is wound around the mandrel into a pipe section.

In one embodiment the two jaws define in a closed position a roll-up basket for guiding the belt substantially 360° around the pipe section that is being rolled up around the mandrel. During the roll up process, the roll-up basket remains in the closed position.

Thus, by actively controlling the transverse movement of the mandrel inside the roll-up basket it is possible to obtain a more homogenous density distribution and fibre structure than by prior art processes.

Each of the two longitudinal jaws extends in a longitudinal direction transverse to the belt which preferably is at least as wide as the length of the pipe section to be manufactured.

The mandrel controlling element is configured for actively controlling a transverse movement of the mandrel by acting on opposing ends of the mandrel. The transverse movement is transverse to the longitudinal direction of the mandrel. The mandrel controlling element is configured for actively controlling the transverse movement of the mandrel between a first position substantially at inner surfaces of the jaws and a second position further in the roll-up basket away from the jaws during manufacturing of the insulating pipe section.

The apparatus can comprise a motor configured for driving the belt.

The mineral wool can be any insulation material with a fibrous structure, like e.g. stone wool or glass wool.

When initiating the manufacturing of the insulating pipe section, the jaws are preferably in the closed position and the mandrel is close to the inner surfaces of the jaws, so that when the mineral wool is wound around the mandrel, the insulating pipe section is given a substantially circular cross-section. As more and more mineral wool is wound around the mandrel, the mandrel is moved laterally away from the inner surfaces of the jaws, so that the pipe section is allowed to grow thicker, while still maintaining the substantially circular cross-section.

That the mandrel controlling element controls the lateral position of the mandrel inside the jaws during the manufacturing process means that the density of the wound mineral wool can be varied as a function of the radius. Mineral wool has a density with optimal insulating properties. The same mineral wool will in a denser or less dense state not insulate as well as the mineral wool having the optimal density. However, often a trade-off approach is applied with balancing the costs and the insulation value.

By actively controlling the transverse movement of the mandrel it is possible to precisely control the density of the mineral wool or even provide a controlled density variation through the thickness of the pipe section. By controlling the transverse position of the mandrel during winding, a pipe section having varying densities can easily be made, where the different types of pipe sections can be used for different situations.

If the inside of a pipe section is made with a low density it can be applied to pipes of different diameters can be arranged in a cavity of the pipe section, since the insulation surrounding the cavity for the pipe has such a low density that a pipe with larger diameter will compress the insulation to get the necessary space. If the inside of a pipe section is made with high density it can be made to fit perfectly on a pipe with the same outer diameter as the inner diameter of the pipe section.

In an embodiment, the belt can form a loop, wherein the mandrel is outside the loop.

That the mandrel is outside the loop means that the mandrel with the manufactured pipe section can easily be removed from the manufacturing position between the jaws, and a new mandrel can be inserted between the jaws.

In an embodiment, the mandrel controlling element can be configured for rotating the mandrel by acting on opposing ends of the mandrel.

The mandrel can have a cylindrical surface with a base at each end. The mandrel normally has a circular cross-section but other cross-sections, like square, rectangular or other polygonal cross-sections, are also possible.

The mandrel can be a hollow cylinder at least at the ends of the mandrel, wherein two other cylinders preferably two tapered cylinders can be inserted in the hollow cylinder for controlling the transversal position of the mandrel and for rotating the mandrel during the manufacturing of the pipe section.

The fibrous insulation winding section of the mandrel is the section where the fibrous insulation is wound onto the mandrel. Of course, it is possible to manufacture shorter pipe sections. In that case, a larger part of the mandrel is outside of the fibrous insulation winding section.

In one embodiment the belt engages the mandrel or the winding uncured mineral wool around the mandrel. By engaging the mandrel is in direct contact and thus the compression of winding uncured mineral wool may be controlled by the tension of the belt acting thereon. As discussed and shown herein, the belt will at least engage the mandrel or the winding uncured mineral wool around the mandrel when the jaws are in the closed position.

In another embodiment the mandrel is rotated by the belt by acting on the wound fibrous insulation. Using this embodiment, the mandrel does not need to be rotated via the wound fibrous insulation only but also by a mandrel controlling element acting directly on the mandrel. The advantage is that the mandrel can have a rotational speed so that the outer layer of the manufactured pipe section has the same surface speed as the belt so that the wound fibrous insulation is not unwound or wound more than intended, which could cause the pipe section to become denser than intended. Of course, the mandrel can be rotated at a rotational speed so that the outer layer of the manufactured pipe section has a higher or lower surface speed than the belt so that the wound fibrous insulation intentionally becomes tighter or looser.

In an embodiment, the apparatus can comprise a belt controlling element configured for controlling a moving speed of the belt, wherein the belt controlling element is configured for keeping the moving speed constant and the mandrel controlling element is configured for reducing the rotation speed during manufacturing of the pipe section.

As the pipe section grows in diameter the speed at the outer layer of the pipe section increases, in case the rotation speed of the mandrel is kept constant. To be able to keep the surface speed of the outer layer of the manufactured pipe section equal to the moving speed of the belt, the belt speed therefore has to increase or the rotation speed of the mandrel has to decrease with increasing pipe section diameter.

It is preferable to reduce the rotational speed of the mandrel as the diameter of the pipe section increases, since it is less technically complicated to control the speed of the mandrel than the speed of the belt, since if the belt speed is increased, feeding speed of the uncured mineral wool will have to increase too. Constant feeding speed of the uncured mineral wool is preferred.

In an embodiment, the at least two longitudinal jaws can be movable in relation to each other for releasing the mandrel in an open position.

When the winding of the uncured mineral wool around the mandrel to form a pipe section is finished, the jaws open up so that the mandrel with the pipe section can be removed from the position between the jaws. Preferably, the jaws can open up so that the mandrel can be removed by a mandrel remover at the two ends of the normally elongated mandrel. A mandrel provider will bring a new mandrel between the jaws before the jaws close again and mineral wool can be wound onto the new mandrel.

In an embodiment, the at least two longitudinal jaws can have each two longitudinal edges and the at least two longitudinal jaws are rotatable around axes at two neighbouring longitudinal edges.

Since the two longitudinal jaws are rotatable around two axes at neighbouring longitudinal edges, the two jaws will in an open position be able to open up widely so that a manufactured pipe section even with a large diameter can easily be removed from the apparatus and particularly from the roll up basket.

In an embodiment, the apparatus can comprise a tensioner for tensioning the belt.

The tensioner keeps the belt tensioned so that the belt can be rotated by a belt controlling element.

In an embodiment, the apparatus can comprise a tension sensor configured for sensing the tension of the belt.

By adjusting the tensioner the belt can be adjusted to have the correct stretch—not too loose, so that the belt controlling element cannot move/rotate the belt, and not too stretched, so that the belt controlling element has to use too much power to move/rotate the belt and/or the pipe section is squeezed together to become too dense. Since the pipe section grows in diameter, the tensioner has to be adjusted during the whole manufacturing process.

By controlling the tension so that the tension is constant means that the pipe section can be made homogenous. As the pipe section grows in diameter, the tension of the belt will increase unless the tensioner is adjusted to allow the diameter of the belt around the mandrel to increase.

In an embodiment, the tensioner can be configured for receiving a tension signal about the tension from the tension sensor for controlling the tension.

As mentioned above, when the pipe section grows in diameter, the tension of the belt will increase unless the tensioner is adjusted to allow the diameter of the belt around the mandrel to increase. To receive a pipe section with a homogenous insulation, the tension of the belt should be the kept constant. A tension sensor can measure the tension of the belt and control the tensioner accordingly.

In an embodiment, the tensioner can be configured for adapting the tension of the belt based on the received tension signal and a predetermined tension. In that way the desired tension can be kept during the whole manufacturing process. For example, by having a lower tension at the beginning of the manufacturing process than at the end, the inner part of the pipe section can be made less dense so that the same pipe section can fit pipes being within a range of diameters. It is also possible to have a higher tension at the beginning of the manufacturing process, so that the inner part of the pipe section has a higher density than the rest of the pipe section.

In an embodiment, the mandrel controlling element can be configured for issuing a position signal, and the tensioner is configured for receiving the position signal.

This provides for the tensioner to consider the position of the mandrel and in some embodiments also the mandrel diameter when controlling the tension of the belt. When combining the position of the tensioner, the position of the mandrel and the known length of the endless belt it is also possible to determine the size of pipe section currently being wound on the mandrel. Furthermore, together with information on the amount and type of the uncured mineral wool used in the process the density/compression of the pipe section may also be deduced. This may for example be derived continuously throughout the process and the tension can be adjusted accordingly, e.g. as discussed previously herein.

At the beginning of the manufacturing of the pipe section the belt lies against the mandrel and the mandrel is positioned close to the roll-up basket opening. When the pipe section grows in diameter, the mandrel will be moved away from the roll-up basket opening in a controlled manner to give space for the growing pipe section.

In an embodiment, each jaw can comprise two jaw end sections, between which rollers are rotatably kept in place for guiding the belt.

In an embodiment, the jaws in a closed position can form a substantially cylindrical shape.

In an embodiment, the apparatus can comprise two flange plates positioned at each base of the mandrel.

The flange plates prevent the wool from being squeezed out to the side during the roll up process. They may also give the manufactured pipe section straight and perpendicular end sections, so that the ends of two pipe sections can placed against each other in a tight and insulating fashion when installed around a pipe. Preferably, however, the ends of a cured pipe section are mechanically cut to ensure completely plane end faces. During the roll up process the flange plates touch the base of the pipe section and can be rotated with the same speed as the mandrel or can be in a free wheel state so that the flange plates rotate when the friction from the rotating pipe section causes the flange plates to rotate.

The invention also relates to a method of manufacturing an insulating pipe section, the method comprising the steps of providing a rotatable longitudinal mandrel, providing a belt, preferably an endless belt, providing at least two longitudinal jaws engaging the belt and substantially surrounding the mandrel with the belt, winding uncured mineral wool on the mandrel for manufacturing a pipe section between the mandrel and the belt, and actively controlling the mandrel in a transverse direction by acting on opposing ends of the mandrel.

In an embodiment, the mandrel can be rotated by a mandrel controlling element acting on opposing ends of the mandrel.

In an embodiment, the mandrel can be rotated by a mandrel rotational speed that decreases as more fibrous insulation is wound on the mandrel.

BRIEF DESCRIPTION OF DRAWINGS

The invention will in the following be described in greater detail with reference to the accompanying drawings.

DETAILED DESCRIPTION OF THE INVENTION

Figure 1A:
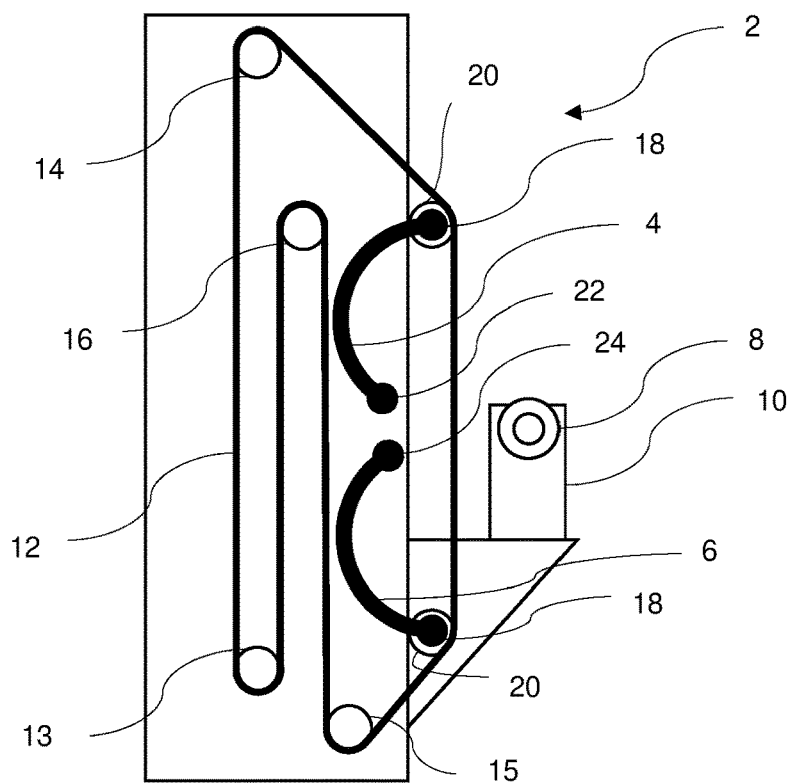
FIG. 1a a schematic view of an apparatus with open jaws.

FIG. 1a discloses an apparatus 2 for manufacturing pipe sections (not shown), the apparatus comprising two jaws 4,6 in an open position. A mandrel 8 is engaged with and held by a linear motion mandrel drive 10. The apparatus also comprises a belt 12 that loops around a first roller 13, a second roller 14, a third roller 15, a fourth roller 16, wherein a belt controlling element (not shown) drives the belt by one or more of the rollers 13,14,15,16. The rollers can have at least the same width as the belt to support the whole width of the belt. The first roller 13 can be a tensioner 13 in the form of a so-called "dancer" that is movable vertically, preferably in a controlled manner by a position controlled motor. When the jaws 4,6 are in the open position, the tensioner has a lower position to keep the belt in a stretched state. Each of the jaws 4,6 comprises two jaw end sections 18 (only one is shown in FIG. 1a-1d) that are connected by longitudinal rollers 20. The rollers 20 guide the belt around the jaws. The jaws 4,6 are pivotable around pivotable axes 22,24, respectively so that the jaws can be opened and closed. In the shown open position of the jaws 4,6 a mandrel with a manufactured pipe section (not shown) can be removed e.g. by a robot (not shown) and receive a new empty mandrel, e.g. by a robot. One of the rollers, 13,14, 15,16 can be suspended by a spring (not shown) for providing elasticity to an otherwise inelastic belt 12. The roller suspended by the spring may have a first force meter (not shown) for measuring the force from the belt acting on the spring suspended roller.

In FIG. 1a the mandrel 8 has just been engaged with the mandrel drive 10 and the mandrel is empty.

Figure 1B:
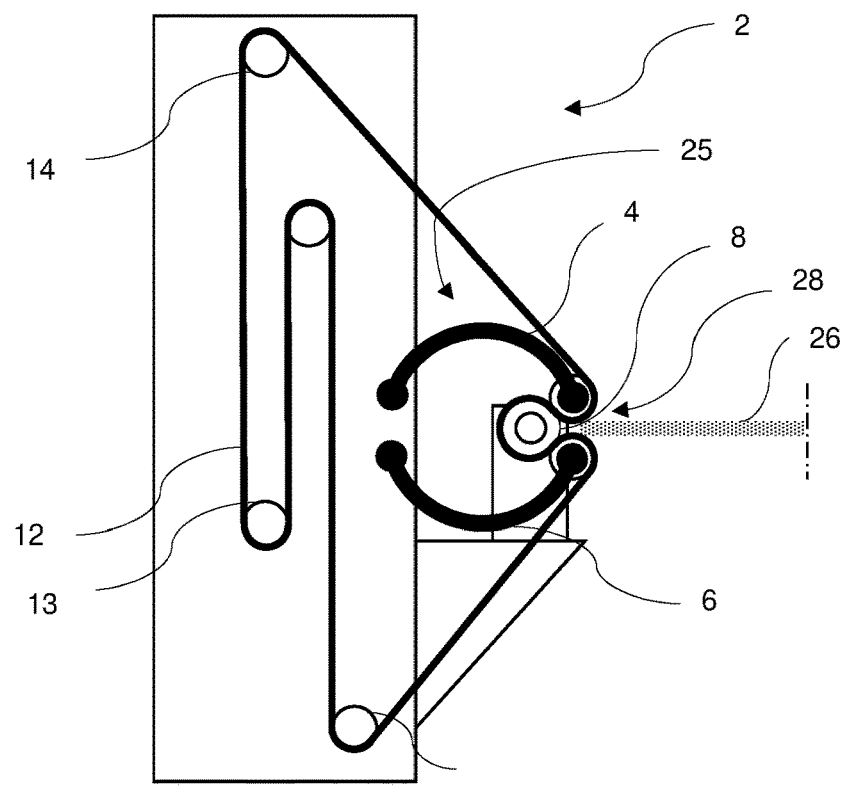
FIG. 1b a schematic view of an apparatus with an empty mandrel surrounded by the jaws.

FIG. 1b discloses the apparatus 2 with the two jaws 4,6 in a closed position forming a roll-up basket 25, the roll-up basket encloses the mandrel 8. When the jaws 4,6 are closed, the mandrel is surrounded by the belt 12. Since the mandrel is surrounded by the belt in the closed position, the length of the belt between the second roller 14 and the third roller 15 around the jaws is longer compared to when the jaws are open as in FIG. 1a. For that reason, the first roller 13 or the tensioner 13 has been moved upwards in FIG. 1b compared to in FIG. 1a.

A web of uncured mineral wool 26, such as stone wool or glass wool, is supplied from the right in FIG. 1b. The uncured mineral wool may be received directly from the production line of the uncured mineral wool or a manufactured web of uncured mineral wool is transported to a position to the right of the apparatus in FIG. 1b and fed to the apparatus. The uncured mineral wool is received between the jaws through a roll-up basket opening 28 and rolled onto the mandrel between the mandrel and the belt as the mandrel and belt are rotated. The mandrel as well as the belt are preferably driven in a controlled manner.

Figure 1C:
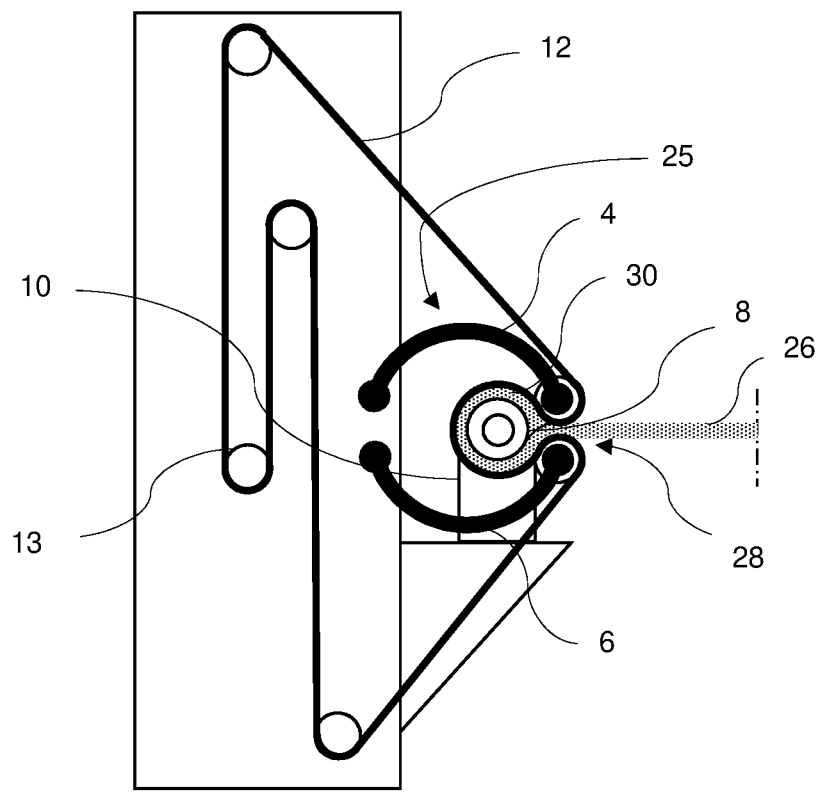
FIG. 1c a schematic view of the apparatus with a half-finished pipe section.

In FIG. 1c, the uncured mineral wool 26 is in the process of being wound around the mandrel 8 to form a pipe section 30. Due to the thickness of the pipe section, a longer section of the belt is inside the jaws 4,6 and in the roll-up basket 25, and the tensioner 13 has moved further upwards from the position shown in FIG. 1b when the mandrel was empty. As more and more uncured mineral wool is wound onto the mandrel to build up the pipe section, the tensioner 13 is gradually moving further upwards.

As can be seen in FIGS. 1b-1c the belt 12 engages the mandrel 8 or the winding uncured mineral wool 26 around the mandrel. Accordingly, the belt can be used to control the compression of the uncured mineral wool by adjusting the tension of the belt and/or the speed of the belt as discussed herein.

Figure 1D:
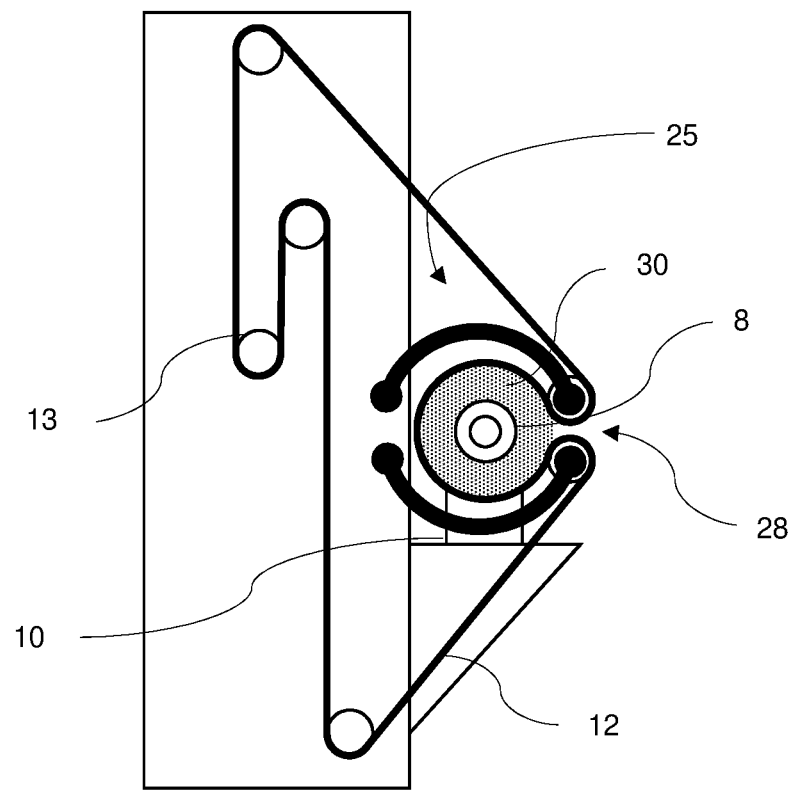
FIG. 1d a schematic view of the apparatus with a finished pipe section.

As the pipe section 30 grows in diameter, the mandrel 8 is moved in a controlled manner by the linear motion mandrel drive 10 to the left towards the centre of the roll-up basket 25 ensuring that the outer diameter of the pipe section is still close to the roll-up basket opening 28 until the manufacturing process of the mandrel is finally finished as shown in FIG. 1*d*.

The feeding speed of the web of uncured mineral wool 26 and the speed of the belt 12 are preferably kept, constant, so that the web of uncured mineral wool is exposed to the same forces and stress during the whole manufacturing process to achieve a homogenous structure of the pipe section. This also means that the rotational speed of the mandrel should be slowed down as the diameter and thus also the circumference of the pipe section increases during the manufacturing process. Likewise, the linear motion mandrel drive 10 will move the mandrel slower and slower as the diameter of the pipe section increases during the manufacturing process.

The tensioner 13 can be biased by a spring, so that the tensioner easily can adapt as the pipe section grows in diameter and can provide a good tension irrespective of the diameter of the pipe section, or the tensioner can keep the belt stretched due to gravity of the tensioner. The tensioner can comprise a tension controlling element for controlling the tension of the belt by controlling the vertical movement of the tensioner. The apparatus can comprise a software that is programmed to actively control the tension controlling element to move the tensioner so that the belt has the desired tension during the whole manufacturing process. That will give a manufactured pipe section with the correct density in order to achieve the desired insulating and physical properties of the pipe section. The tensioner can have a force meter for measuring the tension of the belt. The tensioner may receive the measured force from the force meter and adapt the tension to a predetermined tension of the belt.

The tensioner may take another form than the one shown in FIGS. 1*a*-1*d*. The tensioner may comprise two rollers connected at the ends of the two rollers by two bars, wherein the bars are suspended by a pivotable axis to the apparatus, so that the two bars and the two rollers can pivot around the pivotable axis. The belt is wrapped around one of the two rollers on the right side and around the other of the two rollers on the left side, so that by pivoting the two rollers in one direction the belt is stretched and by pivoting the two rollers in the opposite direction the belt is loosened. The two rollers may be rotated in a controlled manner to ensure the desired tension of the belt at all times during the manufacturing of the pipe section. The two rollers may also be spring-biased or moving due to gravity only if the two rollers are positioned asymmetrically on the pivotable axis.

When the pipe section 30 is finally manufactured as shown in FIG. 1*d*, the jaws 4,6 are opened to the position shown in FIG. 1*a* and the mandrel 8 with the finished pipe section is removed. The finished pipe section is transferred to a curing device, where the uncured mineral wool is cured, conventionally by heat. A new mandrel is positioned in the apparatus 2 so that a new pipe section can wound around the new mandrel, and the manufacturing process is back at the stage shown in FIG. 1*a*. As the jaws are opened the tensioner moves to the lower position of FIG. 1*a* for keeping the belt 12 tensioned.

The jaws close around the new mandrel and a new web of uncured mineral wool is fed to the mandrel through the roll-up basket opening 28, and the manufacturing of the new pipe section can start, as seen in FIG. 1*b*.

Figure 2:
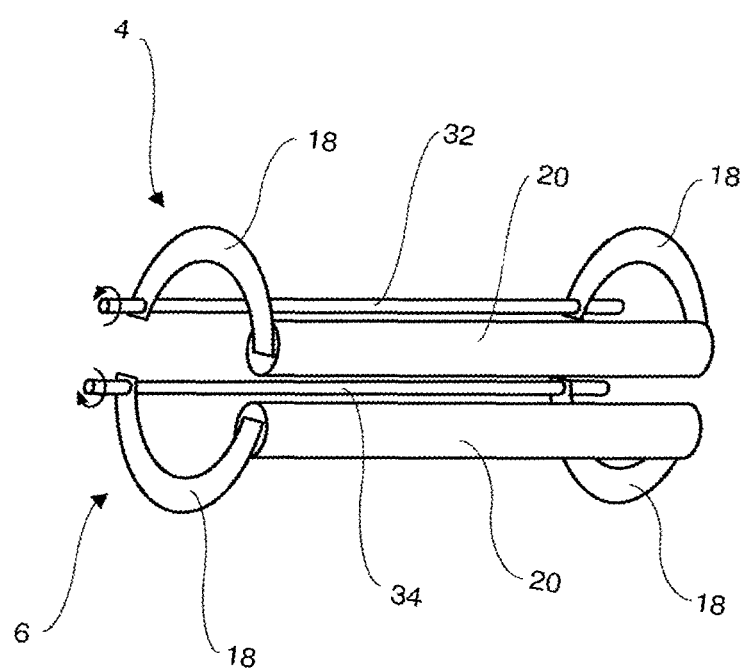
FIG. 2 a schematic view of the jaws.

FIG. 2 shows schematically the jaws 4,6 in a perspective view showing the jaw end sections 18. The longitudinal rollers 20 are held in place by the jaw end sections for guiding the belt (not shown). The jaws 4,6 are pivotable around axles 32,34 which coincides with the axes 22,24 (FIG. 1*a*).

The invention claimed is:

1. An apparatus for manufacturing an insulating pipe section, wherein the apparatus comprises:
   a rotatable longitudinal mandrel configured for receiving and winding uncured mineral wool around the mandrel to manufacture an insulating pipe section;
   a belt;
   at least two longitudinal jaws engaging the belt, wherein the two jaws are configured to move between an open position and a closed position where the jaws are configured for substantially surrounding the mandrel with the belt; and
   a mandrel controlling element configured for actively controlling a transverse movement of the mandrel.

2. The apparatus according to claim 1, wherein the two jaws define, in the closed position, a roll-up basket for guiding the belt substantially 360° around the pipe section that is being rolled up around the mandrel, where the roll-up basket is configured to remain closed during a roll up process.

3. The apparatus according to claim 1, wherein the belt engages the mandrel or the winding uncured mineral wool around the mandrel when the two jaws are in the closed position.

4. The apparatus according to claim 1, wherein the belt forms a loop, wherein the mandrel is outside the loop.

5. The apparatus according to claim 1, wherein the mandrel controlling element is configured for at least one of rotating the mandrel, or and/or moving the mandrel in a transverse direction by acting on opposing ends of the mandrel.

6. The apparatus according to claim 1, wherein the apparatus comprises a belt controlling element configured for controlling a moving speed of the belt, wherein:
   the belt controlling element is configured for keeping the moving speed of the belt a constant speed, and
   the mandrel controlling element is configured for reducing a rotation speed of the mandrel during manufacturing of the pipe section.

7. The apparatus according to claim 1, wherein the at least two longitudinal jaws are movable in relation to each other for releasing the mandrel in an open position.

8. The apparatus according to claim 1, wherein the at least two longitudinal jaws have each two longitudinal edges and the two longitudinal jaws are rotatable around axes at two neighboring longitudinal edges.

9. The apparatus according to claim 1, wherein the apparatus comprises a tensioner for tensioning the belt.

10. The apparatus according to claim 9, wherein the mandrel controlling element is configured for issuing a position signal, and the tensioner is configured for receiving the position signal.

11. The apparatus according to claim 1, wherein the apparatus comprises a tension sensor configured for sensing a tension of the belt.

12. The apparatus according to claim 11, wherein the apparatus comprises a tensioner for tensioning the belt, wherein the tensioner is configured for receiving a tension signal about the tension from the tension sensor for controlling the tension of the belt.

13. The apparatus according to claim 12, wherein the tensioner is configured to move vertically to control the tension of the belt based on the tension signal received from the tension sensor and a predetermined tension.

14. The apparatus according to claim 1, wherein the apparatus comprises two flange plates positioned at each base of the mandrel.

15. A method of manufacturing an insulating pipe section, the method comprising the steps of:
   providing a rotatable longitudinal mandrel;
   providing a belt;
   providing at least two longitudinal jaws engaging the belt and substantially surrounding the mandrel with the belt;
   winding uncured mineral wool on the mandrel for manufacturing an insulating pipe section between the mandrel and the belt; and
   actively controlling movement of the mandrel in a transverse direction.

16. The method according to claim 15, wherein the mandrel is rotated by a mandrel controlling element acting on opposing ends of the mandrel.

17. The method according to claim 15, wherein the mandrel is rotated by a mandrel rotational speed that decreases as more uncured mineral wool is wound on the mandrel.

18. The method according to claim 15, wherein the uncured mineral wool is cured in a curing device.

19. The method according to claim 15, wherein the movement of the mandrel in a transverse direction is provided by actively controlling opposing ends of the mandrel.

20. The apparatus according to claim 1, wherein the belt is an endless belt.

* * * * *